(12) United States Patent
Keller-Tuberg

(10) Patent No.: US 6,189,042 B1
(45) Date of Patent: *Feb. 13, 2001

(54) LAN INTERNET CONNECTION HAVING EFFECTIVE MECHANISM TO CLASSIFY LAN TRAFFIC AND RESOLVE ADDRESS RESOLUTION PROTOCOL REQUESTS

(75) Inventor: Stefan Paul Keller-Tuberg, Raleigh, NC (US)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/057,173

(22) Filed: Apr. 8, 1998

(30) Foreign Application Priority Data

Apr. 9, 1997 (AU) .................................................... PO6105
Apr. 28, 1997 (AU) .................................................... PO6431

(51) Int. Cl.[7] ...................................................... H04J 3/24
(52) U.S. Cl. ......................... 709/238; 709/222; 370/405
(58) Field of Search ...................... 370/405, 312, 370/349, 219, 401; 709/249, 228, 245, 222, 238

(56) References Cited

U.S. PATENT DOCUMENTS

| | | | |
|---|---|---|---|
| 5,159,592 | * 10/1992 | Perkins | 370/85.7 |
| 5,337,309 | * 8/1994 | Faulk | 370/405 |
| 5,412,654 | * 5/1995 | Perkins | 370/312 |
| 5,473,599 | * 12/1995 | Li | 370/219 |
| 5,490,139 | * 2/1996 | Baker | 370/312 |
| 5,515,513 | * 5/1996 | Metzger | 709/249 |
| 5,526,489 | * 6/1996 | Nilakantan | 709/208 |
| 5,610,905 | * 3/1997 | Murthy | 370/401 |
| 5,724,355 | 3/1998 | Bruno et al. | 370/401 |
| 5,818,842 | * 10/1998 | Burwell | 370/397 |
| 5,854,901 | * 12/1998 | Cole et al. | 709/245 |
| 5,864,535 | * 1/1999 | Basilico | 370/231 |

FOREIGN PATENT DOCUMENTS

| | | |
|---|---|---|
| 2-134943 | 5/1990 | (JP) . |
| 9-214564 | 8/1997 | (JP) . |
| 10-107852 | 4/1998 | (JP) . |
| 10-247946 | 9/1998 | (JP) . |
| 10-308762 | 11/1998 | (JP) . |

* cited by examiner

Primary Examiner—Zarni Maung
Assistant Examiner—Khanh Quang Dinh
(74) Attorney, Agent, or Firm—Ware, Fressola, Van Der Sluys & Adolphson, LLP (57) ABSTRACT

A method to reduce the amount of Address Resolution Protocol (ARP), traffic in a LAN environment connected to the Internet via multiport gateway, 63. The gateway, 63, stores a list of terminals connected to its local LAN Paths 61, 62, and determines if the destination of the ARP request is one of the terminals, 611 . . . 622, connected to the local LAN paths. If the destination terminal is not connected to the local LAN paths, the gateway does not rebroadcast the ARP request to the local LAN paths.

14 Claims, 8 Drawing Sheets

LAN INTERNET CONNECTION HAVING EFFECTIVE MECHANISM TO CLASSIFY LAN TRAFFIC AND RESOLVE ADDRESS RESOLUTION PROTOCOL REQUESTS

TECHNICAL FIELD

This invention relates to a method and arrangement of providing high speed data services to a large number of users via a communications network.

BACKGROUND ART

The provision of mass market Internet services presents traffic management problems for both telecommunications carriers and Internet Service Providers.

At present most private users are connected to the Internet over modems which operate in the voice band. These services have low transmission rates and also tie up the exchange connection preventing simultaneous use of the phone on the same line and loading the exchange.

High speed access technologies have emerged which make the delivery of fast data and data-like services practical for the mass/broad market. Such technologies include transmission technologies such as ADS and Hybrid Fibre Coax and multiplexing/Switching technologies such as ATM A number of IP based access services have been implemented and often use ATM. as an underlying transport technique. However in these implementations, the carriage of services must be based on the Internet Protocol by necessity and so the underlying ATM flows must be terminated at each location at which IP traffic is processed. Therefore in IP based access networks which use ATM as the underlying transport, the advantages of using end to end ATM are foregone.

For an ATM end to end based access service, it has been necessary to establish individual ATM connections carrying AAL5 encapsulated data across the entire network between each subscriber and their ISP(s) of choice. In a mass market deployment of ATM technology, for example high speed Internet access based on ATM to residential subscribers, the number of ATM flows can amount to 10s to 100s of thousands simultaneously.

A service provided, such as an Internet Service Provider, may need to terminate an individual information flow from each to its subscribers. This requirement could be imposed for service reasons, billing reasons, security reasons or routing reasons. Typical large ISPs must design their systems to cope with up to hundreds of thousands of subscribers.

In an ATM connected scenario, at least two issues arise for service providers:

ATM interface cards for switches and workstations terminate a finite maximum number of simultaneous ATM connections. Typically, this maximum number of connections is of the order of 1000 or fewer. This maximum number of ATM connections is significantly fewer than the number of subscribers to a large ISP.

The cost of leased public ATM links is generally relatively expensive compared with the competitive price charged for a single residential internet service. In order to remain viable, ISPs offering high speed internet access over ATM would therefore require each leased ATM link into the public network to be shared by a relatively large number of residential subscribers. Certainly, the number of subscribers sharing a 155 Mbit/s link (for example) would need to be much greater than 1000.

Routing in the access network via traditional means is unsuitable in a multi service provider environment or in an environment where the service provider is different from the access network provider. This is because "routing" is a service which provides a value added connectivity and could potentially lead to traffic nominally service by a particular service provider to bypass or be routed around that service provider altogether.

Other issues arise in an ATM connected scenario which affect both access carriers and service providers:

The logistical and technical difficulty of managing individual end to end ATM connections for each subscriber is significant.

SUMMARY OF THE INVENTION

It is desirable to provide an efficient means of interconnecting LAN traffic via the network.

Accordingly, this specification describes a LAN environment wherein there is a data gateway with a plurality of ports, each of a plurality of LANs being connected to a corresponding port; each LAN having associated with it a corresponding range of IP (Internet Protocol) addresses; wherein the date gateway includes a mask arrangement or look up table whereby the data gateway responds to destination addresses within a range of IP addresses to forward traffic to the corresponding LAN.

The invention will be described with reference to the connection of a plurality of Internet users via LANs to a number of Internet Service Providers (ISP), or quasi-ISP such as corporations providing telecommuting facilities for their employees. The term "service provider" will be used to refer to both ISPs and quasi-ISPs.

BEST MODE FOR CARRYING OUT THE INVENTION

Figure 1:
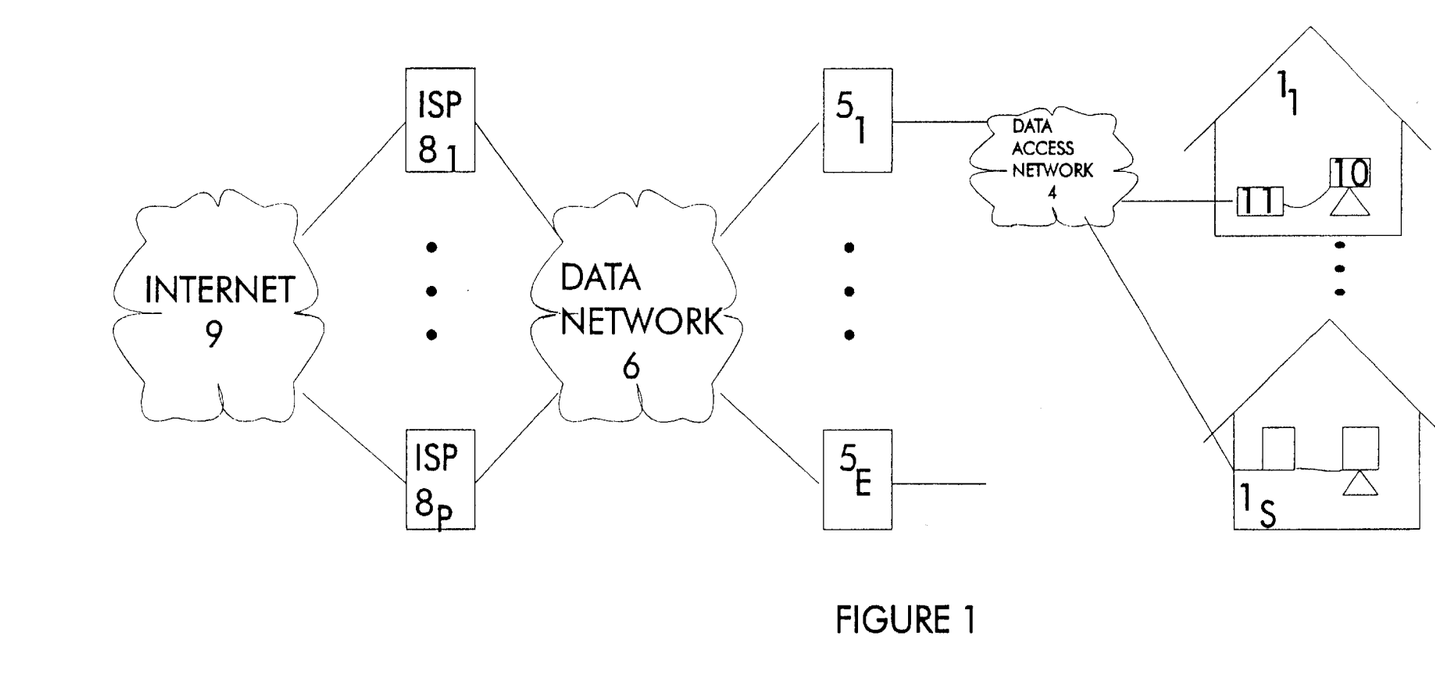
FIG. 1 shows an end to end architecture for a mass market Internet access system described in our co-pending application "High Speed Data Services Arrangement", including a subscriber data network exemplified in the drawing as an ADS access network.

FIG. 1 is a representation of end to end Internet access implemented using the invention of the above co-pending application. A plurality of subscribers 11 . . . 1S or RIM (Remote Integrated Multiplexers) (also known as Metropolitan Area Networks) are connected to the host access exchange 5 via a data access network 4. A plurality of access exchanges, 51 ... 5E, are interconnected through data network 6. A plurality of Internet Service Providers (ISP) or other types of service provider, 81 ... 8P, are each connected between the Internet, or other data infrastructure 9, and the data network 6.

Each subscriber may have one or more computers, 10, and modems, 11.

The data access network may include ADS links over copper pairs which originate at a local exchange or Remote Integrated Multiplexer (RIM) connected to the rest of the telecommunications network via highly capacity links such as optical fibres.

RIM equipment serves as a point of termination of the ADS connection which can be located sufficiently close to the subscribers to enable ADS to be used over the installed copper pair base at information speeds compatible with high speed data services.

Other high speed links to subscribers may also be used, e.g., SDH, Hybrid Fibre Coax etc.

Information to be sent to the ISP by the subscriber is initially assembled in packet form and then converted to an efficient form for transmission.

Preferably, communication from the subscriber is carried using ATM, packets for transmission being divided into ATM cells.

Figure 3:
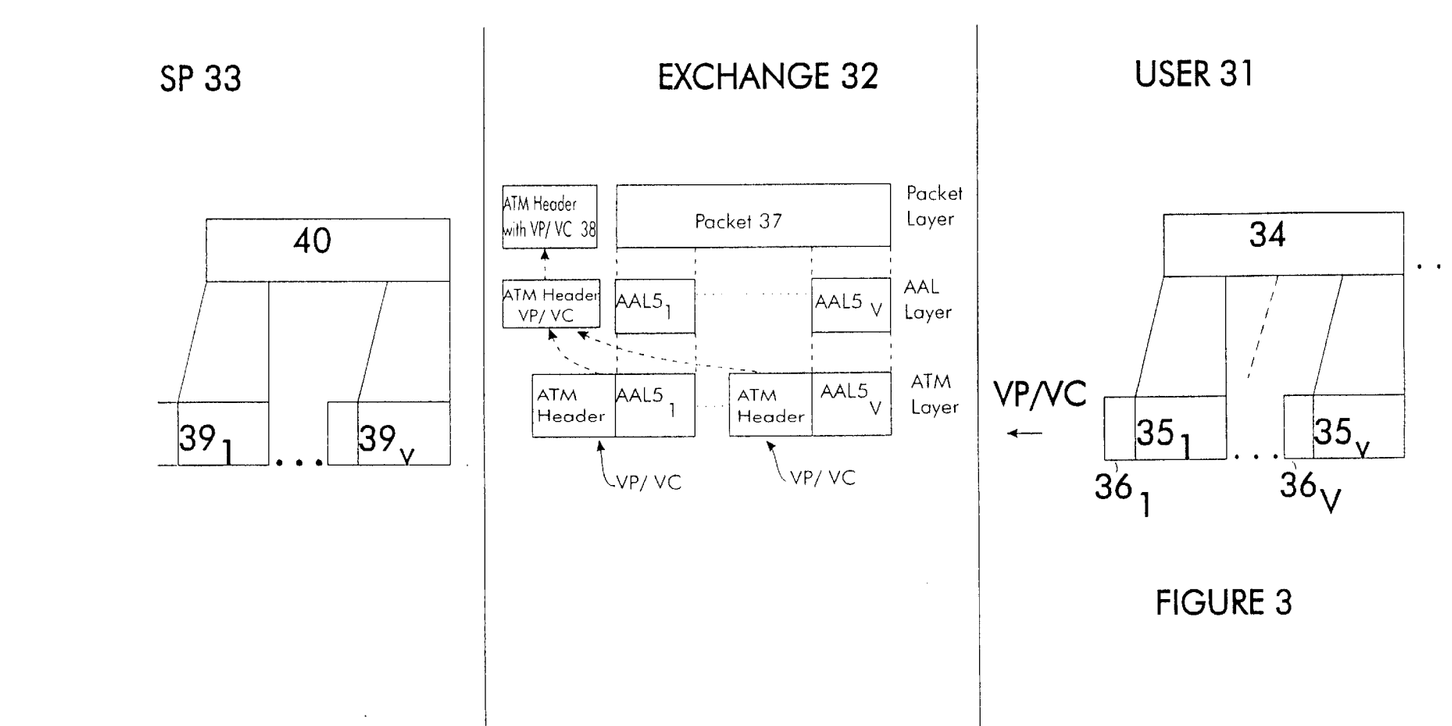
FIG. 3 illustrates the process of transferring data from the subscriber to the ISP.

As shown in FIG. 3, packets, 34, to be sent from the user are converted into VP/VC format at the AAL5 level, e.g., using an ATM card in the user's PC, which breaks up the packet into ATM cells, $35_1 \ldots 35_y$, and adds cell headers, $36_1 \ldots 36_y$, for transmission to the exchange network in ATM format. The source and destination addresses of the packet are transmitted with other packet header information.

At the user exchange interface, the ATM cells are terminated and the data assembled into packets 37 with header 38 including source and destination addresses, for onward transmission through the network.

At the exchange, the ATM channel on the subscriber's line is associated with a previously assigned ISP via a look up table.

At the exchange/ISP interface, the packets are divided into VP/VC format at the AAL5 level with cell headers for transmission as ATM cells to the ISP where the ATM cells are terminated and the data assembled into packets, 40.

In a preferred "Intranet" arrangement, a number of small sites such as corporate sites with telecommunicating facilities can be concentrated into the network using a gateway box to provide a "broker" function to establish individual connections to the small sites.

Figure 2:
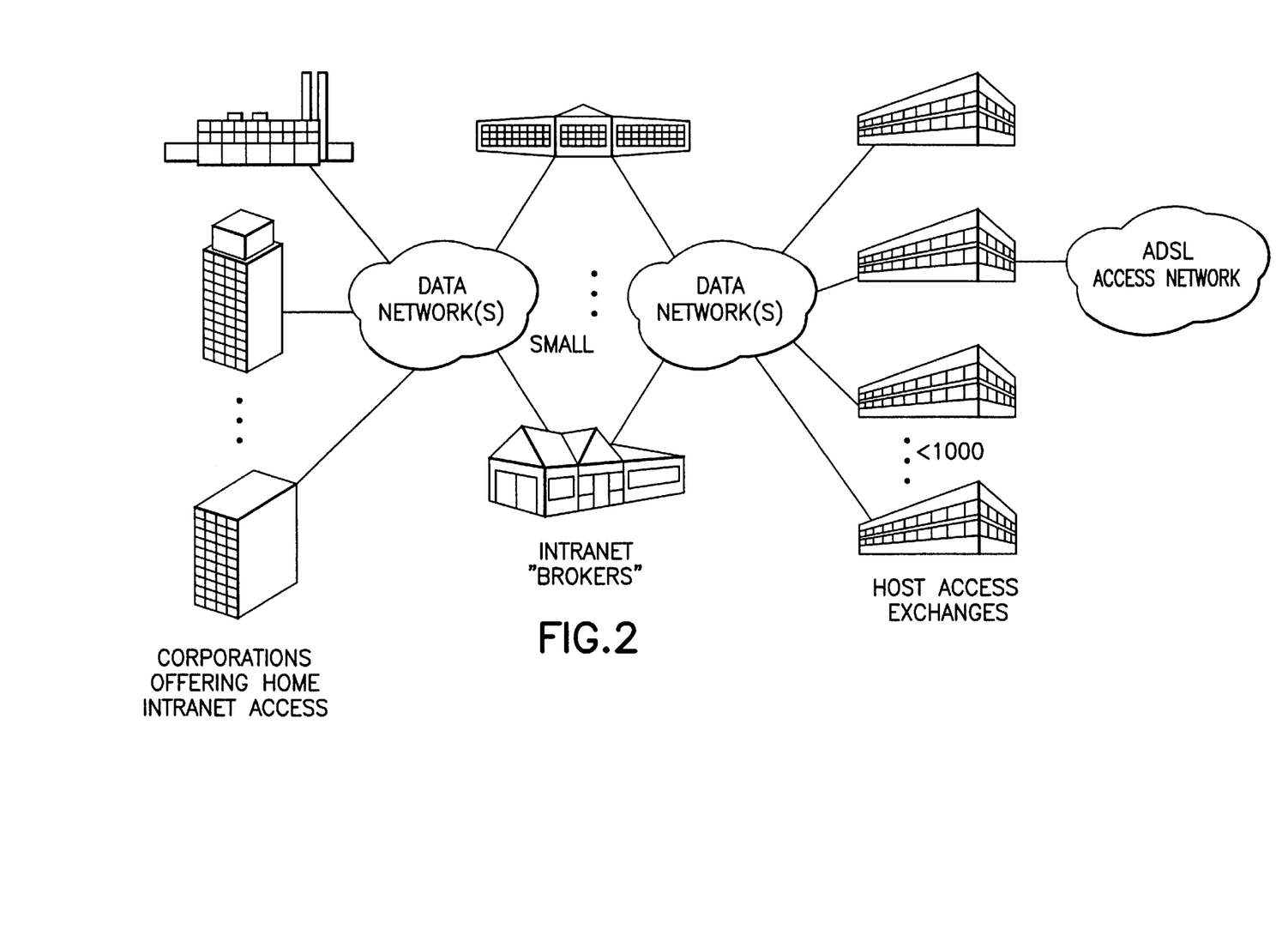
FIG. 2 shows a system including a corporate Internet arrangement embodying the invention.

This arrangement is illustrated in FIG. 2.

A problem which arise when providing closed user group (CUG) access in a public data service arrangement where additional protocol overhead is added, e.g., in the form of VP/VC identifiers to segregate the information is that, in large network with many users, the efficiency of utilization of the network is reduced because the additional protocol information must be exchanged for each packet.

This specification discloses a method and arrangement of providing CUG access in a public data service environment in a more efficient manner. The implementation of the transmission of different CUGs in the same logical pipes without additional protocol or connection identifiers to specifically identify the CUG membership of each frame is described. The source address, destination address or a combination thereof which are naturally resident in each frame can be used to identify the CUG membership of the frame at the remote end of the connection.

The frame protocol(s) which are allowed to be communicated through the shared CUG connection must be restricted to known protocols. For example, all traffic from all CUGs communicated through the shared link should be "native IP".

Each originator or destination must have a unique address within the frame address space. If the chosen protocol is IP for example, each originator and destination must have a unique IP address within the domain of the shared CUG connection.

Prior to multiplexing the traffic from different CUGs together into the one logical connection, security verification of the frame addresses must be performed to prevent users of one CUG proofing users of another.

Figure 5:
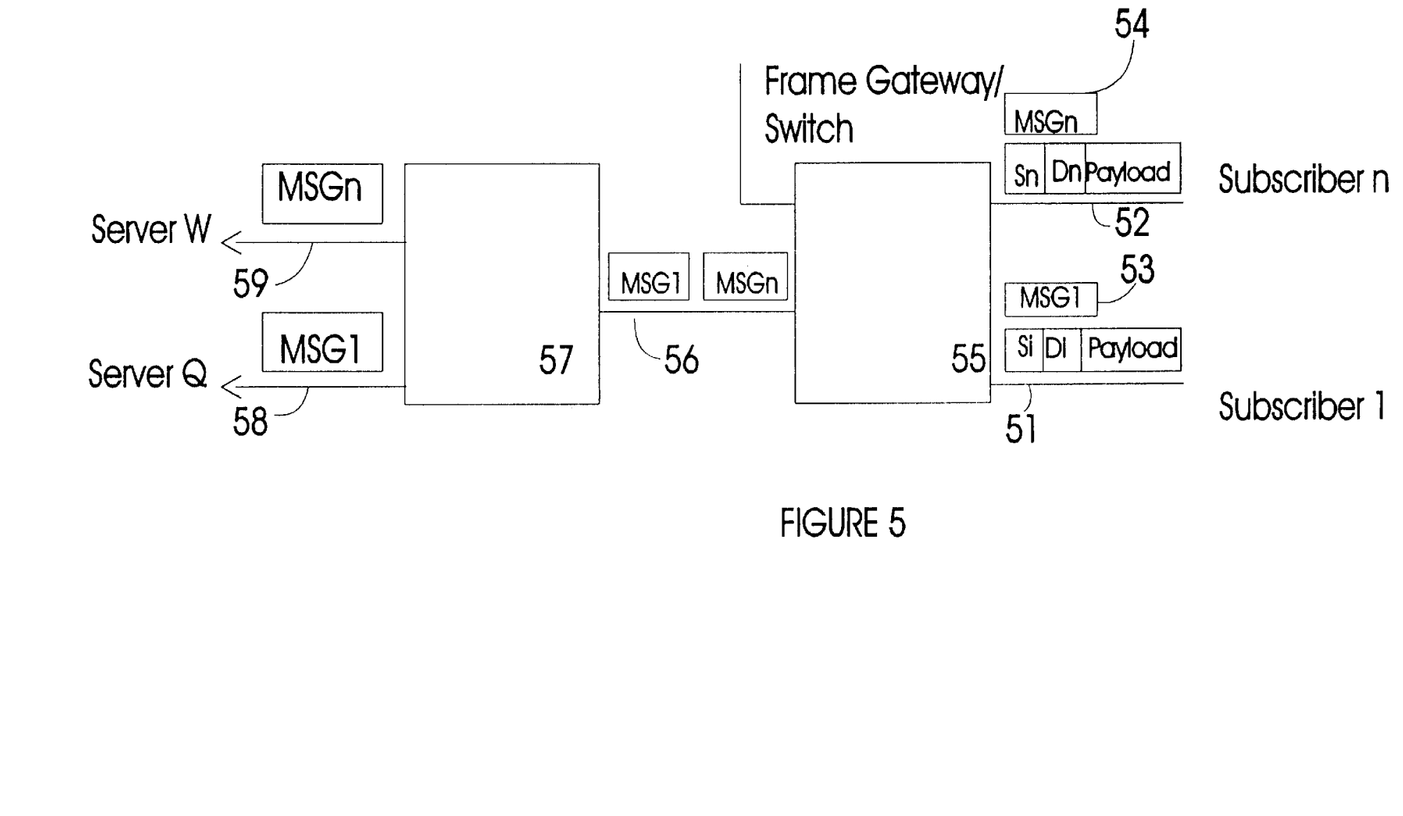
FIG. 5 illustrates the implementation of closed user groups (CUG) over the network in accordance with an embodiment of the invention.

FIG. 5 illustrates the process of segregating the CUG information from subscribers (Subscriber 1 ... Subscriber n) connected to a first frame gateway or switch 55 to respective Servers Q and W via gateway 57. The packets are shown as being reassembled e.g. from the ATM cells into MSG1 and MSGn from Subscriber 1 and Subscriber n respectively. Each message includes source (S1, sn) and destination (D1,Dn) information and an associated payload.

Because both destination serves Q and W are connected to the same switch 55, MSG1 and MSGn are multiplexed over port 56 to switch 57, where they are separated to ports 58 and 59 to reach their intended destinations.

In this way the messages are segregated without the need for the additional protocol information.

Similar considerations apply for "downstream" transmissions.

The present invention provides an efficient means of connecting LANs via the network.

Data gateways with three or more logical ports considering of one or more local LANs and one or more remote LANs/networks perform a switching role: traffic received on one port is subjected to a routing, forwarding or bridging algorithm to determine to which (if any) of the remaining ports on the data gateway the frame should be switched.

In a LAN environment, hosts wanting to communicate with other hosts connected to different LANs must direct their frames to the data gateway (or bridge/router etc.) using the gateway's LAN MAC (Medium Access Control) address. In prior art, the date gateway has one MAC address to which it responds for each port. The gateway receives frames one at a time and executes a "routing", "bridging" or "forwarding" algorithm which may examine the source and destination addresses at the next protocol layer or use tables of MAC address mappings to determine the correct egress port. The gateway directs the frame, after possible queuing onto the egress port.

Larger gateways with more ports require more complicated routing/bridging/forwarding algorithms. The execution of a routing algorithm on a per frame basis introduces additional end to end delay and requires more processing capacity as traffic and ports increase. Recently approaches known as "TAG SWITCHING" have been proposed which confine the requirement for executing of a routing algorithm to only the ingress and egress nodes to the tag switched network.

When operating the Internet Protocol (IP) on a broadcast LAN, such as Ethernet 802-3, a mechanism called ARPing (Address Resolution Protocol) is used to resolve the physical LAN addresses of other hosts within the same IP sub-network prior to communication between those two hosts.

In extremely large subnets which are connected at the LAN MAC layer (Medium Access Control), for example when the number of hosts exceeds 1000, the level of broadcast traffic due to ARPs becomes significant and affects the performance of all hosts. In a mass market high speed data services arrangement, the total number of subscribers could exceed many hundreds of thousands and the level of broadcast traffic due to ARPing is likely to cause the performance of the network and many of the computers connected to the network to degrade significantly or even totally.

In large networks, an address resolution mechanism which does not propagate ARP requests or necessitate broadcasts is required. As LAN segments and subnets grow in size, it is common practice to decipher the larger LAN segment and subnet into multiple smaller LAN segments separated by bridges and routers. Bridges maintain the subnet relationship between the LAN segments but do not typically contain broadcast. Routers divide the larger subnet into smaller subnets containing broadcasts, but involve the reconfiguration of all hosts in the former large subnet to be aware of their newly reduced subnet.

Broadcasting and its adverse affects can be avoided if the large subnet is divided into a number of smaller subnets. LANs in one of the smaller subnets are bridged at the IP layer to avoid forwarding of broadcast. However this requires implementation of routers to join the various smaller subnets which in turn requires modification of the network parameters in each and every host in the former large subnet. In order to avoid dividing the larger subnet into smaller subnets and avoid the requirements for host reconfiguration the ARP mechanism still needs to be handled.

To avoid the reconfiguration of the original hosts, a mechanism called "Proxy ARP" as defined by RFC-925 can be implemented in the routers. A proxy ARPing router listens for ARP broadcast on each of the LAN segments to which it is connected and when necessary, provides ARP responses on behalf of the remotely connected hosts.

If the proxy ARPing router receives an ARP request for a host already known to be on a different LAN segment, it is able to immediately respond providing its own LAN MAC address. The original host now communicates via the proxy ARPing router for further communications with the ultimate destination. In this case, the ARP broadcast is contained to the originating LAN segment.

If the proxy ARPing router receives an ARP request for a host whose location is not known, it must relay the ARP request using broadcast on all its other LAN ports. If an ARP response is received on one of these other ports, the proxy ARPing router makes an association between that port, the destination IP address and LAN MAC address and finally provides a proxy ARP response using its own LAN MAC address to the originally requesting host on the first LAN. Communication between the two hosts can now proceed as above however, in this case, the ARP broadcast was not contained to the originating LAN segment.

Proxy ARPing routers can be transparently connected in cascade to achieve more complicated network topologies but according to the prior art of proxy ARPing described in RFC-925, when proxy ARPing routers are connected together by non broadcast LANs, a point to point proxy ARPing protocol must be implemented between the proxy ARPing routers to take the place of an ARP broadcast.

The proxy ARPing algorithm described by RFC-925 does not terminate the original ARP broadcast when the requested address is unknown: it merely forwards the broadcast to its other LAN ports. The proxy ARPing mechanism therefor does not terminate broadcast in all cases.

RFC-925 proposes that to contain broadcast or to allow for non broadcast LANs, the addresses of other hosts or proxy ARPing routers on the non broadcast LAN be statically configured. This introduces an issue of practically and manageability of the static tables when the subnet size on the non broadcast side of the proxy ARPing router is very large. Also in this situation, proxy ARPing may not significantly reduce the level of broadcast like traffic.

This specification discloses a method and arrangement in which the data gateway responds to a range of LAN MAC addresses on each of its LAN connections. Each of the date gateway's LAN MAC addresses present at a particular LAN port are used to reference one (or more) of the data gateway's other local or remote ports.

A further method of improving the interaction of LANs with the network is disclosed in a further embodiment including a LAN environment, having a plurality of LANs, each connected to a corresponding port of a data gateway, each LAN having associated with it a corresponding range of IP addresses, and wherein the data gateway includes a mask arrangement, the data gateway allocating traffic on the basis of the ranges of IP addresses.

Because the date gateway has different individual LAN MAC addresses which correspond to the data gateway's other ports, the task of frame forwarding or routing in the data gateway is greatly simplified or eliminated because the data gateway does not need to examine the higher layer addresses contained within each frame. The end to end delay and the data gateway processing requirements are reduced.

This specification therefore discloses in a LAN environment including a plurality of stations or hosts connected to a local communication path and at least a first gateway having at least a first port connected to the local communication path and a second port coupled to a one or more further paths and/or a network, the gateway including stored data identifying stations connected to the local communication path;

a method of determining the location of a destination station identified in an Address Resolution Protocol message (ARP request) broadcast by one of the stations connected to the communication path, wherein the first gateway does not relay ARP requests received on one end of its ports to a further port if the destination station is not connected to the local communication path.

In a further embodiment the first gateway includes sorted data indicating the identity of stations connected to one or more further communication paths and the identity of the associated further communication paths, the first gateway forwarding communication establishing requests addressed to stations connected to further communication paths only to the further communication to which the addressed station is connected. In a third embodiment when the first gateway does not specifically know the address of an addressed station or know the address of the gateway connecting to the remote station's subnetwork such that the first gateway has no predefined direct communications route leading towards the addressed station, the first gateway is configured to respond to the requesting station with an address corresponding to a default route or communication path towards a more authoritative gateway which is responsible for determining a route or path to the addressed station. In a fourth embodiment each further communication path is coupled to individual ports of the first gateway via corresponding further gateways, and wherein stored data in the first and further gateways associates each station with the corresponding gateway to which its associated communication path is coupled.

In a fifth embodiment when a gateway receives an ARP request from a station coupled to the communication path associated with another of the ports of the gateway, the gateway responds by and with the LAN MAC address of that other port.

In a sixth embodiment in order to enable communication with a mobile station associated with a first local communication path whether the mobile station is connected to the local communication path or whether it is connected to a further communication path or elsewhere, the gateway including one local port for each local communication path and one or more remote ports for connection to remote sites, wherein the gateway stores the identify of the port and/or the site from which the most recent communication from the mobile station is received and uses this to establish a communication link to the mobile station, so that ARP requests for the mobile station are not rebroadcast over other ports of the gateway.

In a seventh embodiment the method includes measuring the time since the most recent communication was received from the mobile station, and deactivating the stored information as to the location of the mobile station after a predetermined period has elapsed.

The invention also includes an arrangement for carrying out the foregoing methods.

Figure 6:
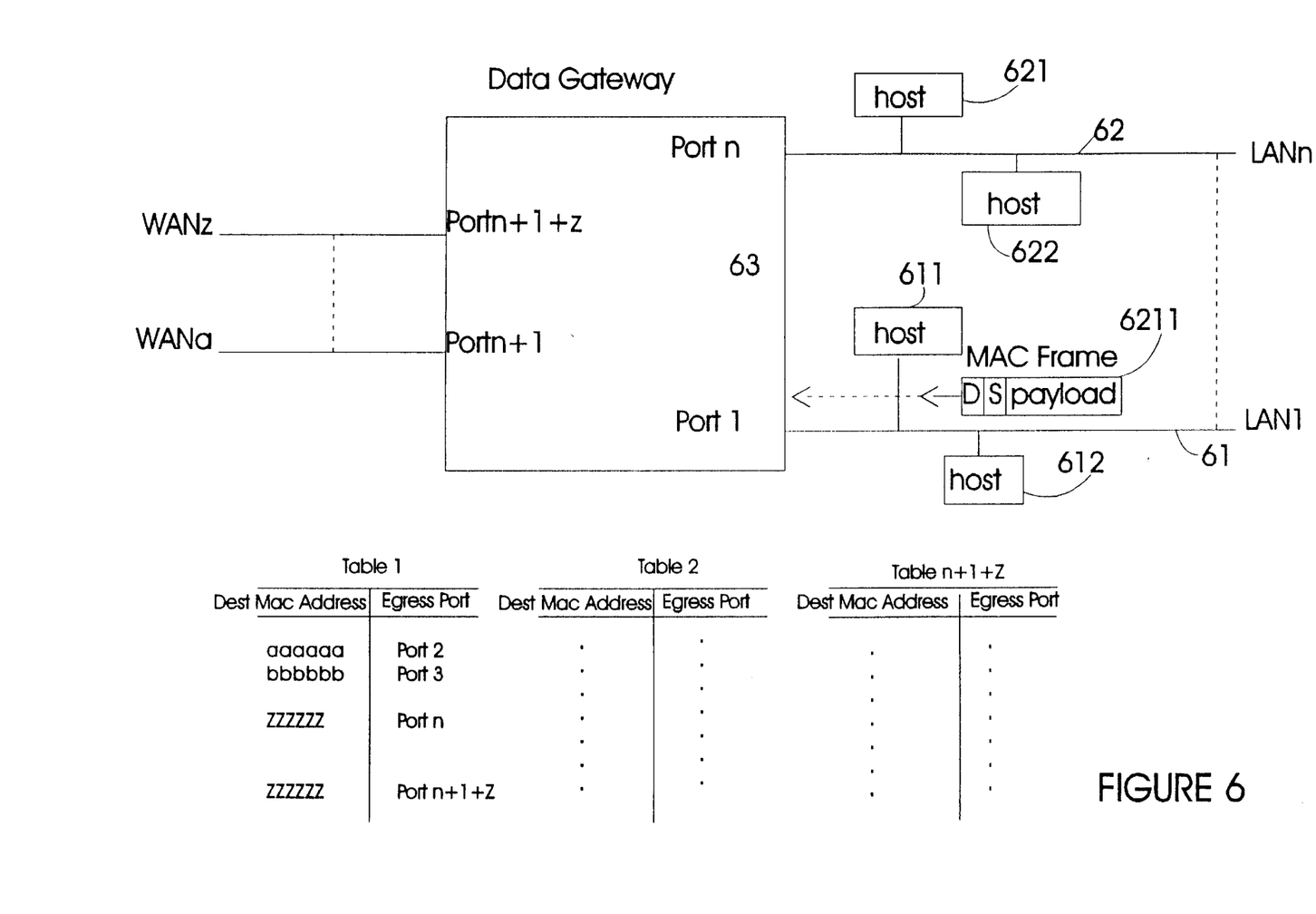
FIG. 6 shows the interconnection of a plurality of LANs in accordance with an embodiment of the invention.
Figure 7:
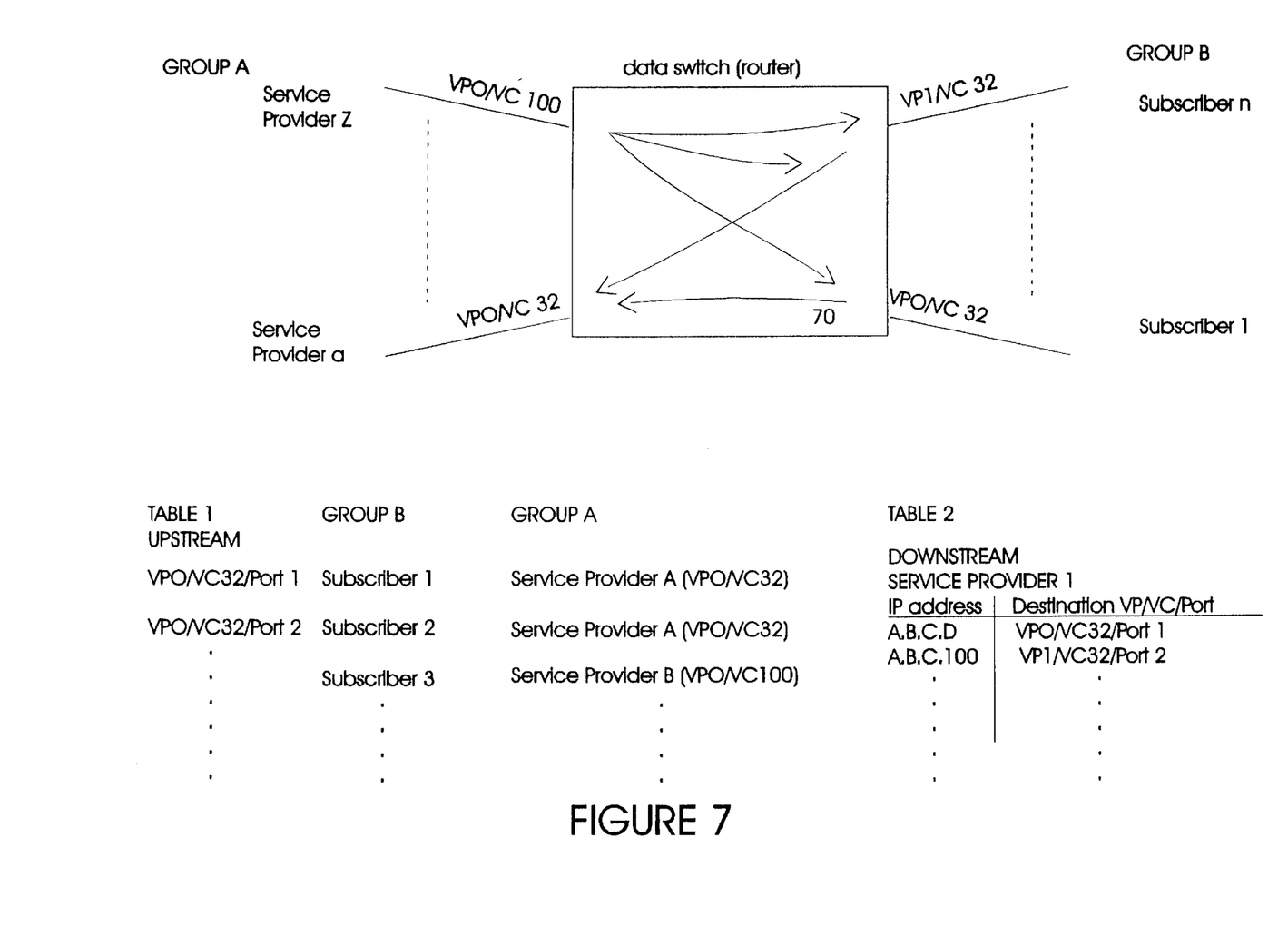
FIG. 7 illustrates an arrangement for associating a subscriber with a single service provider in accordance with an embodiment of the invention of the above co-pending application.

FIG. 6 shows a plurality of LANs (61,62) each with associated hosts (611, 612; 621, 622) connected to corresponding ports (Port 1 . . . Port n) of data gateway 63. A further plurality of ports (Port n+1 . . . Port n+1+Z) connect to, e.g., a plurality of WANs (WANa . . . WANZ).

Information is conveyed on each LAN in the form of a MAC frame, e.g. 6211, having destination address information in its header.

The data gateway 63 includes a look-up table which is used to associate a LAN MAC destination address with an egress data gateway port and redirect the information to the port to which the destination is connected on the basis of information contained in the MAC address.

In an alternative arrangement, there may be a look-up table associated with each port. (Table 1, Table 2, Table n+1+z)

In our arrangement (FIG. 4), the proxy ARPing router is replaced with a "routing bridge" 43. The routing bridge implements an algorithm which is an improvement on the proxy ARPing algorithm.

Figure 4:
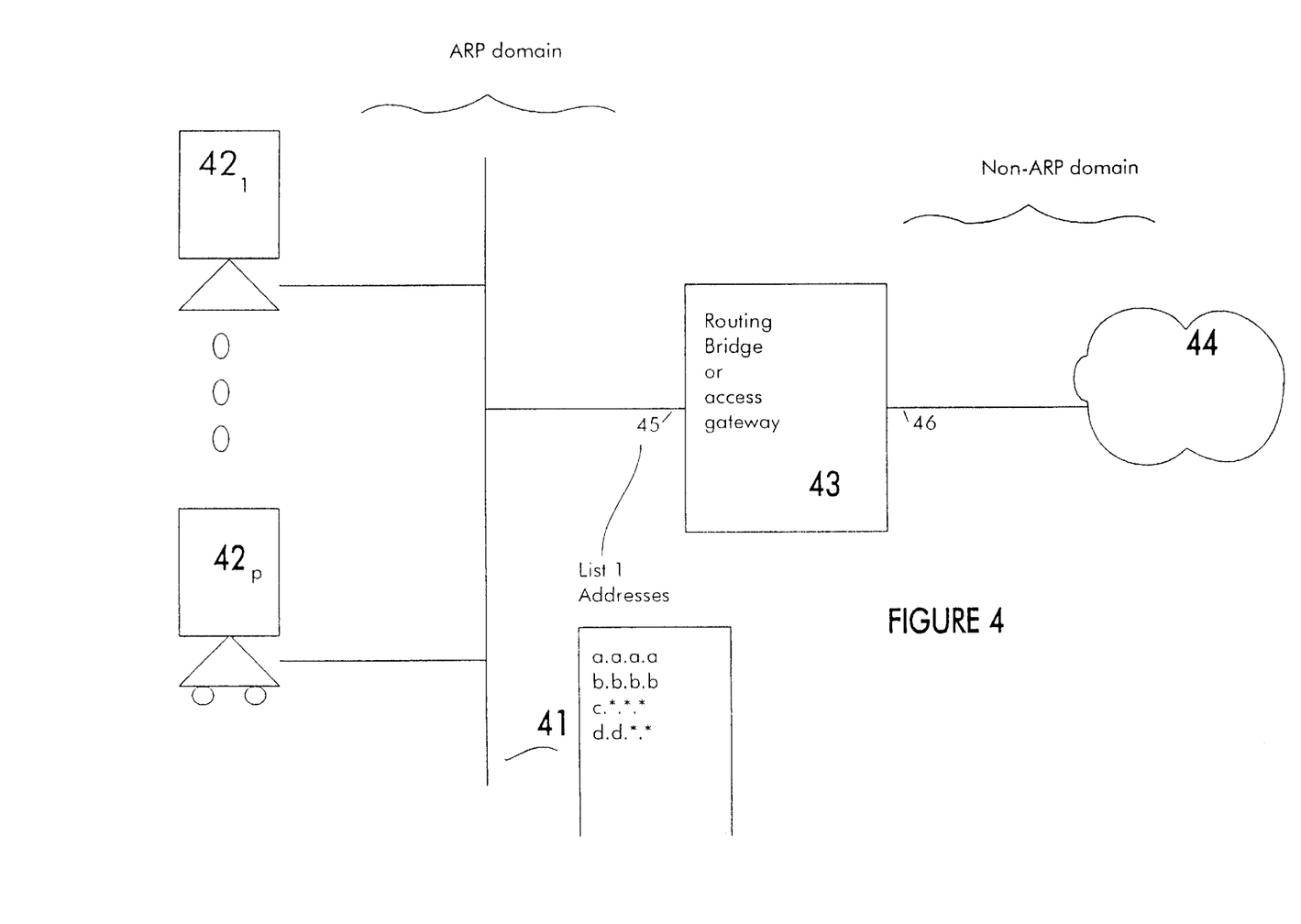
FIG. 4 illustrates the connection of a LAN to the network.

The routing bridge has at least one port 45, "local port", connected to a local LAN 41 which uses a broadcast ARP protocol for address resolution. The local LAN serves only a part of the overall subnet. Local hosts 421 . . . 42p are connected on the local LAN.

The routing bridge has at least one other port 46, "remote port", connected into the remainder of the large subnet 44. This other port may or may not use a broadcast mechanism for the resolution of physical addresses.

The routing bridge must be configured with each IP address or range of IP addresses which exist on the local port(s) (List 1). When the routing bridge receives an ARP request on a local port it checks to see if the address being ARPed exists in the list of local addresses. If the address is found to be local, it disregards the ARP request and does not respond. When the routing bridge receives an ARP request on a local port for an address which it finds to be outside the list of local addresses, it immediately and always responds to the ARP request by providing one of its own LAN MAC addresses. The routing bridge then uses a non-ARP mechanism to associate the destination address with a network port.

The local host will now use the MAC address provided by the routing bridge for communication with the remote host. ARPing has been contained on the local LAN.

A further embodiment of the invention provides an effective means classifying LAN traffic and resolving ARPs without propagating ARP broadcasts.

Figure 8:
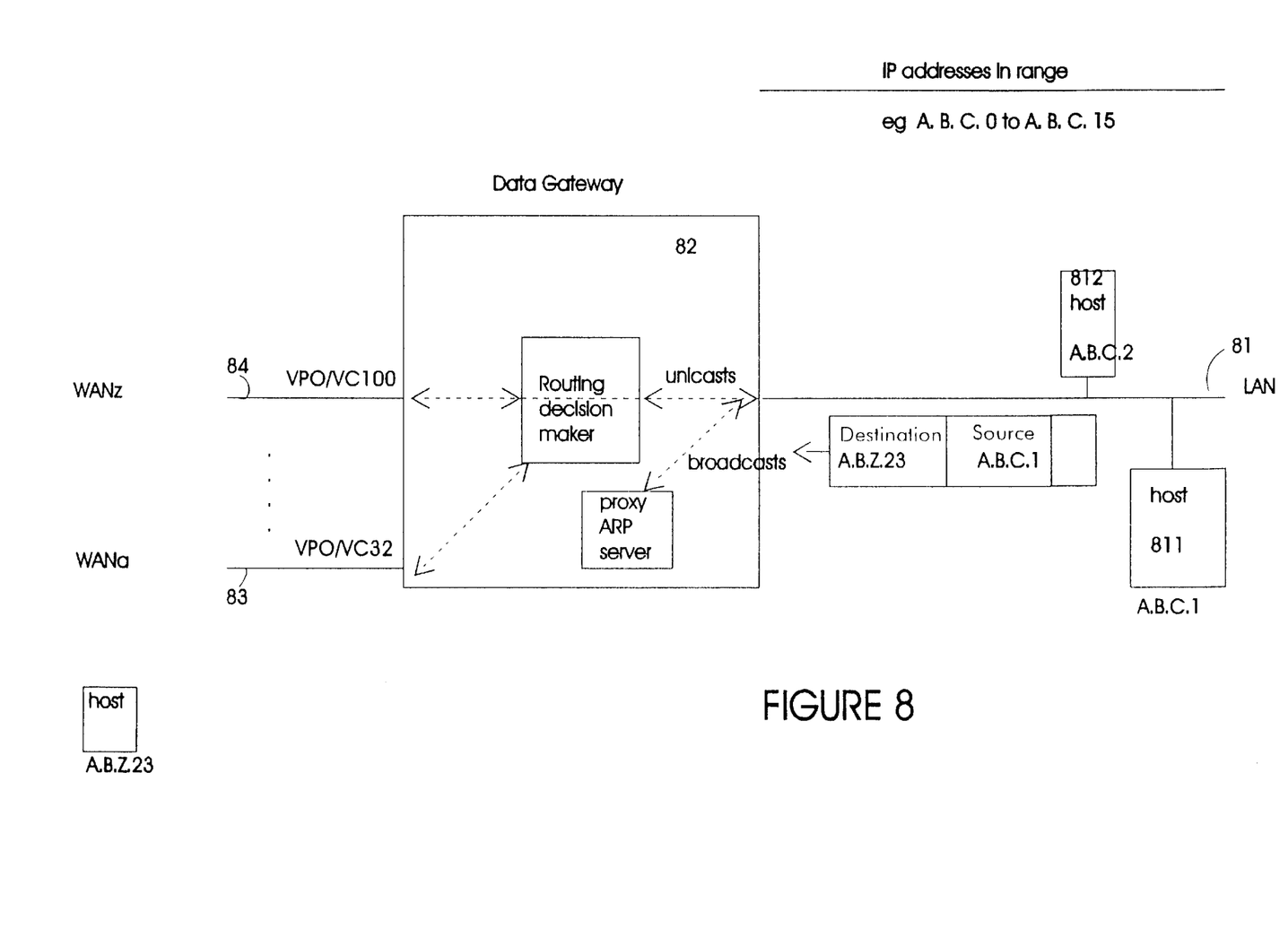
FIG. 8 illustrates the connection of a LAN to the network via a bridge, in accordance with an embodiment of the invention.

FIG. 8 illustrates a LAN, 81, connected to a network via a learning bridge or data gateway 82. The LAN includes a plurality of hosts 811, 812. The network may include one or more WANs, 83, 84.

Each host on the LAN, e.g. 811, 812, has IP address(es) in the form A.B.C.1, A.B.C.2 (e.g. 32 bit addresses), which preferably fall within an identifiable and unique range (A.B.C . . .).

The data gateway implements and responds to multiple MAC addresses at each of its ports eg port 81. Each one of such multiple MAC address is defined to correspond to one of the data gateway's other ports.

The data gateway 82 can recognize the hosts on the LAN by a mask if they all have addresses within a range e.g. A.B.C.0 to A.B.C.15. Otherwise the gateway 82 may have a table listing the hosts connected to the LAN. If a LAN host e.g. 811 ARPs for a host on the LAN e.g. 812, the bridge recognizes that the destination is local and does not respond. If the bridge recognizes that the destination is "outside" the LAN, it responds.

The hosts on each LAN learn about the data gateway MAC addresses using a protocol such as ARP. When a local host wishes to communicate with a remote host, the data gateway responds to the ARP from the local host by providing it with the MAC address which corresponds to the network port via which the remote host can be reached. If the same local host wishes to communicate with a different remote host connected to a different network port on the data gateway, the data gateway responds to the second ARP request with a different MAC address. In this way, local hosts learn different routes to the remote destinations by the data gateway's use of different MAC addresses for each destination LAN so the packet by packet routing decisions which occur much more frequently than ARPing can be made by the local hosts rather than the data gateway.

With telecommuting, an employee can work from a fixed PC at work or a fixed PC at home, each PC having a specific address. However, when the employee has a portable PC, the network needs to be able to determine the status and location of the PC in order to determine how to respond to ARP requests.

FIG. 4 illustrates an arrangement to enable the mobile PC's location to be ascertained. The arrangement includes a corporate LAN, 41, to which a plurality of terminals are connected including mobile PC 42. The LAN 41 is connected to the data network 44 via a high speed access gateway 43 which provides secure access to the high speed network and incorporates a "learning bridge" capability.

The access gateway operates by forwarding traffic to the external network only when the location of the addressee is known to be remote, i.e. if the addressee is registered with the bridge as being connected to one of its remote ports. However, if a terminal on the local corporate LAN broadcasts for the mobile (ARPing: address Resolution Protocol), the access gateway cannot forward the broadcast because the gateway operates at the IP protocol layer and the ARP broadcast is below this layer at the MAC layer.

The access gateway can be programmed to provide a proxy response on behalf of the mobile PC, but should not respond if the mobile PC is actually connected to the local corporate LAN because the mobile PC must then respond on its own behalf, and duplicate responses would terminate or confuse the communication.

The access gateway is thus programmed to respond as a proxy for the mobile only when the access gateway has previously learned that the mobile PC is at an external location such as the employee's home and has recently communicated to prove that it is still there.

Initially, the mobile PC may be located at a remote location. When the mobile PC is turned on and ready to communicate over the high speed access network, it must initiate a communication with a host on the corporate LAN in order for the access gateway to learn that its position is remote. Such an initial communication might be a communication from the mobile PC to another computer connected to the corporate LAN. After the initial communication from the mobile PC, the access gateway learns that the mobile is remote and the gateway is enabled to provide proxy ARP responses to other computers on the corporate LAN indicating that the mobile PC can be reached through that particular access gateway.

At some later stage, the mobile PC might disconnect from its remote location and be transported to another remote location reachable by a different route via the high speed access network. Alternately, the mobile PC could be transported to the corporate LAN location and be directly connected. In this case, a mechanism is required so that the access gateway disregards the information that it had previously learned about the mobile PC's whereabouts.

We propose that the access gateway implements a timer which is used to determine that the mobile PC has or is in the process of changing location. The access gateway should restart the timer each time it receives a communication from the mobile PC. For as long as the timer has not expired, the access gateway should continue to respond to ARP requested received on the corporate LAN for that mobile PC and should forward packets to and from the mobile PC in either respective direction. For example a default time could be set at 10 minutes after the last response, so that the access gateway will only respond as proxy within 10 minutes of the last communication from the mobile PC at the remote location.

What is claimed is:

1. In a LAN environment including:
   a plurality of communication paths each having a plurality of stations connected thereto wherein said communication paths include one or more local communication paths and one or more further communication paths; and
   at least one gateway having one or more local ports, each connected to a corresponding one of the local communication paths and one or more second ports each of which coupled to a further communication paths and/or a network,
   a method of forwarding an Address Resolution Protocol message (ARP request) including a location of a destination station broadcast by one of the stations connected to one of the communication paths, wherein the gateway includes stored data associated with the communication paths, so that the gateway forwards a communication establishing an ARP request only to the communication path to which the addressed station is connected, said method comprising the steps of:
   including in the stored data a range of addresses associated with the local and second ports; and
   determining from the range of addresses the local port and second port to which the ARP request will be forwarded so as to eliminate the need to forward the ARP request to the communication paths not connected to the addressed station.

2. The method of claim 1, wherein the reqesting station is connected to one of the local communication paths.

3. The method of claim 1, wherein the requesting station is connected to one of the further communication paths.

4. The method of claim 1, wherein the range of addresses comprises LAN MAC addresses of the stations connected to each of the local communication paths.

5. The method of claim 2, wherein the range of addresses comprises LAN MAC addresses of the stations connected to the local communication path to which the requesting station is connected.

6. The method of claim 2, wherein the range of addresses comprises LAN MAC addresses of the stations connected to the communication paths other than the communication path to which the requesting station is connected.

7. The method of claim 1, wherein the range of addresses comprises IP addresses of the stations connected to the local communication paths.

8. The method of claim 1, wherein the range of addresses comprises LAN MAC addresses of the stations connected to the further communication paths.

9. The method of claim 1, wherein the range of addresses comprises IP addresses of stations connected to the further communication paths.

10. The method of claim 1, wherein the LAN environment further includes one or more further gateways connecting to one or more sub-networks of further communication paths and wherein said further gateways include a more authoritative gateway which is responsible for determining a route or path to an addressed station connected to one of the sub-networks, so that when the gateway cannot determine from the range of addresses the address of the addressed station, or the address of the further gateway connecting to the addressed station's sub-network such that the first gateway has no predefined direct communications route leading towards the addressed station, the gateway responds to the requesting station with an address corresponding to a communication oath towards the more authoritative gateway so as to eliminate the need to forward the ARP request to the communication paths not connected to the more authoritative gateway.

11. The method of claim 1, wherein each further communication path is coupled to individual ports of the gateway via corresponding further gateways, and wherein the stored data further includes information associating each of the stations connected to the further communication paths with the corresponding further gateway so as to allow the ARP request to be forwarded to the further communication path to which the addressed station is connected without being forwarded to the communication paths not connected to the addressed station.

12. The method of claim 1, wherein in order to enable communication with a mobile station associated with one of the local communication paths whether the mobile station is connected to one of the other local communication paths or whether it is connected to one of the further communication paths or elsewhere, the method further includes the setup of storing the identity of the port from which the most recent communication from the mobile station is received so that this identity can be used to establish a communication link to the mobile station so as to eliminate the need to rebroadcast the ARP requests from the mobile station over the ports of the gateway.

13. The method of claim 12, further including the steps of measuring the time since the most recent communication was received from the mobile station, and deactivating the stored information as to the location of the mobile station after a predetermined period has elapsed.

14. An arrangement for locating a mobile station in a LAN environment including a data gateway having a plurality of local ports, and a plurality of LANs each connected to a corresponding local port, wherein one of the LANs is connected to a network via a learning bridge device, and wherein the mobile station is associated with one of the LANs, said arrangement comprising:

stored data associating each one of the local ports with a range of LAN MAC addresses associated with the other local ports; and a mask arrangement or look up table to allow the data gateway to forward a LAN frame received on any one of the local ports to one of the other local ports marked by the LAN MAC address included in the LAN frame on the basis of the range of LAN MAC addresses such that the data gateway does not forward the LAN frame to the ports that is not masked port, wherein the learning bridge device is programmed to proxy for the mobile station only when the data gateway has detected that the mobile station is connected to the network side of the data gateway so as to eliminate the need to forward an ARP request destined to the mobile station to the local ports.

* * * * *

UNITED STATES PATENT AND TRADEMARK OFFICE
CERTIFICATE OF CORRECTION

PATENT NO. : 6,189,042
DATED : February 13, 2001
INVENTOR(S) : Keller-Tuberg

It is certified that error appears in the above-identified patent and that said Letters Patent is hereby corrected as shown below:

Column 10, line 42, claim 10, line 14, "oath" should be --path--.

Column 10, line 61, claim 12, line 6, "setup" should be --step--.

Column 10, line 66, claim 12, line 11, before "ports", --other-- should be inserted.

Column 12, line 7, "masked" should be --the marked--.

Signed and Sealed this

Fifth Day of June, 2001

*Attest:*

*Attesting Officer*

NICHOLAS P. GODICI
*Acting Director of the United States Patent and Trademark Office*